US007886202B2

(12) United States Patent
Lin et al.

(10) Patent No.: US 7,886,202 B2
(45) Date of Patent: Feb. 8, 2011

(54) SYSTEM AND METHODS FOR RECORDING, DISPLAYING, AND RECONSTRUCTING COMPUTER-BASED SYSTEM AND USER EVENTS

(75) Inventors: Phillip Lin, Raleigh, NC (US); Anne Ryan, Durham, NC (US); Steven Miller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 12/038,690

(22) Filed: Feb. 27, 2008

(65) Prior Publication Data

US 2009/0217106 A1 Aug. 27, 2009

(51) Int. Cl.
*G06F 11/00* (2006.01)
(52) U.S. Cl. .......................................... 714/57; 714/10
(58) Field of Classification Search .................... 714/57
See application file for complete search history.

(56) References Cited

U.S. PATENT DOCUMENTS

| 5,872,966 | A * | 2/1999 | Burg | 719/313 |
| 6,651,095 | B2 * | 11/2003 | Barlock et al. | 709/223 |
| 6,658,594 | B1 * | 12/2003 | Bui et al. | 714/10 |
| 7,681,089 | B2 * | 3/2010 | Ashmore | 714/57 |
| 2003/0066048 | A1 * | 4/2003 | Kumhyr et al. | 717/101 |
| 2003/0069944 | A1 * | 4/2003 | Barlock et al. | 709/220 |

* cited by examiner

*Primary Examiner*—Scott T Baderman
*Assistant Examiner*—Kamini Patel
(74) *Attorney, Agent, or Firm*—Novak Druce + Quigg LLP

(57) ABSTRACT

A computer-implemented method for tracking computer system events and user actions is provided. The method includes detecting one or more system events of a computing system and one or more user actions performed on the computing system. The method also includes recording at least one system event and at least one user action. Additionally, the method includes synchronizing the recordation of the at least one system event and the recordation of the at least one user action. The method further includes presenting to a user the recordation of at least one system event and the recordation of at least one user action.

21 Claims, 4 Drawing Sheets

SYSTEM AND METHODS FOR RECORDING, DISPLAYING, AND RECONSTRUCTING COMPUTER-BASED SYSTEM AND USER EVENTS

FIELD OF THE INVENTION

The present invention is related to the field of computer systems, and more particularly, to systems and methods for tracking computer system events and user-initiated actions as well as to systems and methods for handling and diagnosing computer system anomalies.

BACKGROUND

Although computer programs typically execute in a computer system without major problems, users on occasion encounter system failures or other system-based anomalies. For example, a computer program or entire computer system can hang or crash during execution of one or more programs. A hang typically occurs when the application or system becomes unresponsive to user-supplied input, using for example a keyboard or mouse. A crash typically occurs when a program, either an application problem or operating system, ceases to perform anticipated functions or exits abnormally after encountering a problem.

In either event, there is the risk that a user will lose valuable data, perhaps a considerable amount, even if the user has periodically saved data during execution of the program. Moreover, regardless of whether or not data is lost owing to a computer system failure such as a hang or crash, a user usually will need to re-start every program that was in use before the failure, and every document typically will need to be read once again when the system is re-booted following the failure. Indeed, without an effective and efficient technique to re-start the computer system in the state it was in prior to the failure, previously-running programs will need to be re-started, previously-open documents re-opened, and all previously-established network connections re-established

SUMMARY

According to one aspect described herein, there is provided a computer-based system for tracking computer system events and user actions. The system can include at least one processor for processing electronic data based upon processor-executable instructions. The system also can include a memory communicatively linked to the one or more processors for storing electronic data. The system further can include an events-and-actions tracking module configured to execute upon the at least one processor. The events-and-actions tracking module can be configured to cause the system to detect at least one system event of a computing system and at least one user action performed on the computing system, to record the at least one system event and at least one user action, to synchronize the recordation of the at least one system event and the recordation of the at least one user action, and to present to a user the recordation of the at least one system event and the recordation of the at least one user action.

Another aspect described herein is a computer-implemented method for tracking computer system events and user actions. The method can include detecting at least one system event of a computing system and at least one user action performed on the computing system. The method also can include recording the at least one system event and at least one user action. Additionally, the method can include synchronizing the recordation of the at least one system event and the recordation of the at least one user action. The method further can include presenting to a user the synchronized recordation of the at least one system event and of the at least one user action.

Still another aspect is a computer-readable storage medium, such as an optical disk, in which is embedded computer-readable code that when loaded onto and executed by a computer cause the computer to perform the following: detect at least one system event of a computing system and at least one user action performed on the computing system; record the at least one system event and at least one user action; synchronize the recordation of the at least one system event and the recordation of the at least one user action; and present to a user the recordation of the at least one system event synchronized with the recordation of the at least one user action.

BRIEF DESCRIPTION OF THE DRAWINGS

There are shown in the drawings, embodiments which are presently preferred. It is expressly noted, however, that the invention is not limited to the precise arrangements and instrumentalities shown.

DETAILED DESCRIPTION

The aspects described herein are directed to systems and methods for tracking computer system events and user actions. One aspect is the automated recording of the operations of a computing device, system or machine along with system events and user actions. Another aspect is the correlation, which can be performed seamlessly, of system events with user actions. Still another aspect is the interpretation and reconstruction of the state of a computing device or machine at a specified breakpoint, obviating the need for performing a full back-up of the device or machine. Yet another aspect is the prioritization of recorded system events and user actions, which can be effected according to a user-specified profile, and the capability to alter a format of previously-saved and dynamic data so as to efficiently utilize all allocated program space of the computing device or machine. The recording of system events and user actions prior to some system failure or unanticipated condition, moreover, can assist in diagnosing the circumstances associated with such a failure or condition.

Figure 1:
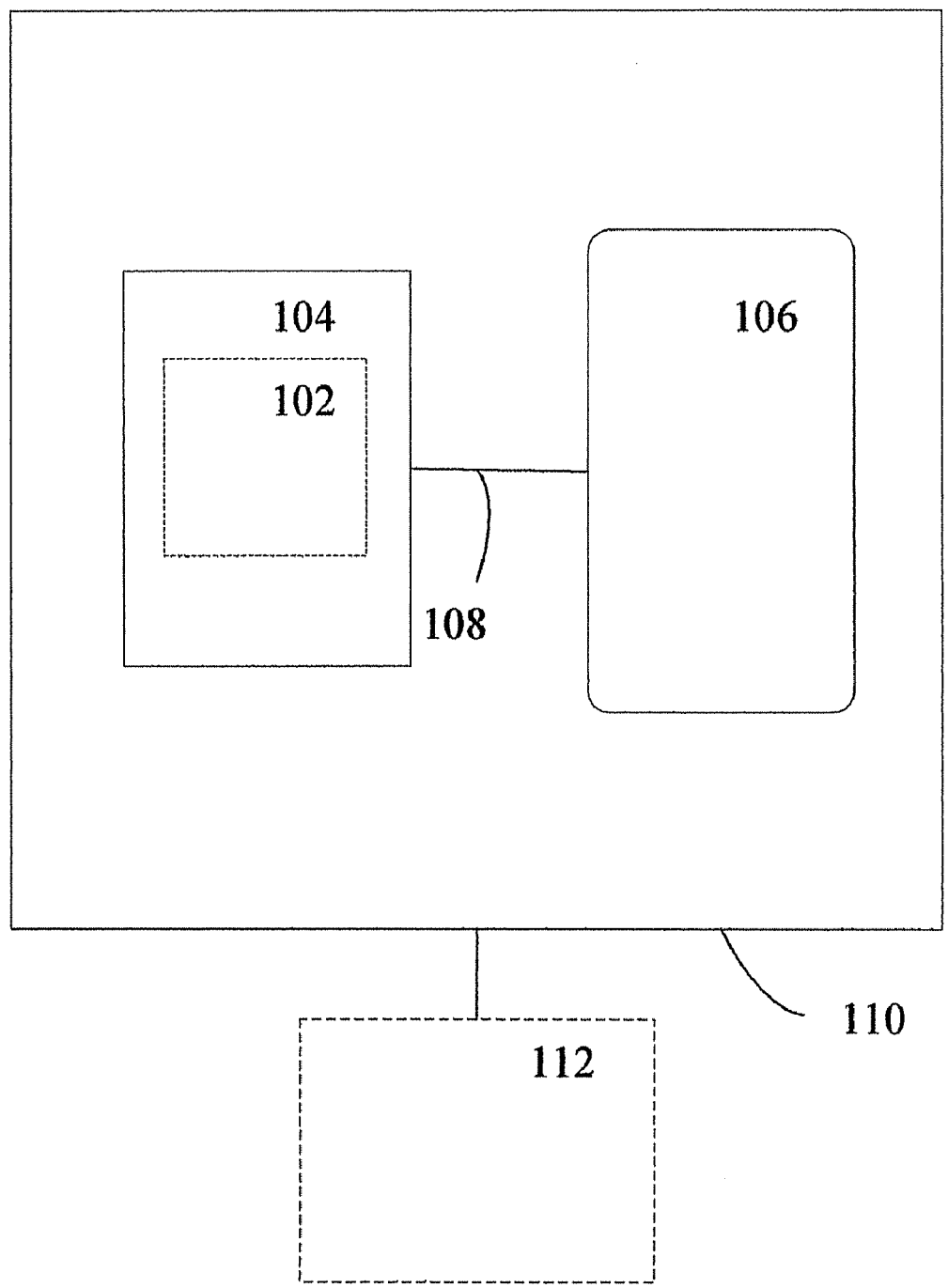
FIG. 1 is a schematic view of an exemplary computer system in which a module for tracking computer system events and user actions, according to one embodiment of the invention, is utilized.

FIG. 1 is a schematic view of an exemplary computer system 100 in which an events-and-actions tracking module 102 for tracking computer system events and user actions, according to one embodiment of the invention, is utilized. The exemplary computer system 100 illustratively includes at least one processor 104. The processor 104 can be implemented with a plurality of logic gates, registers, and other logic-based circuitry (not explicitly shown) configured to process electronic data according to processing instructions that execute upon the processor. The computer system 100 also illustratively includes dedicated hardwired circuitry, defining a memory 106, for storing electronic data and processor-executable instructions. Illustratively, the processor 104 and memory 106 are communicatively linked through electronic circuitry defining a bus 108 configured to electronically to transfer data and processor-executable instructions between the processor and memory. The processor 104, memory 106, and bus 108 are shown as co-located within a housing 110. It is noted, however, that in other embodiments the processor 104 and memory 108 though communicatively linked to one another need not be contained within a single unit. Additionally, the computer system 100 can optionally include a peripheral input/output (I/O) device 112, such as a computer terminal keyboard, display screen, and/or electronic computer-connected mouse.

The events-and-actions tracking module 102, more particularly, is illustratively implemented in processor-executable code configured to execute on the processor 104 for causing the system 100 to perform the procedures and functions described herein. Alternatively, however, the events-and-actions tracking module 102 can be implemented in dedicated, hardwired circuitry for performing the same procedures and functions. In still another embodiment, the events-and-actions tracking module 102 can be implemented in a combination of processor-executable code and hardwired circuitry.

Figure 2:
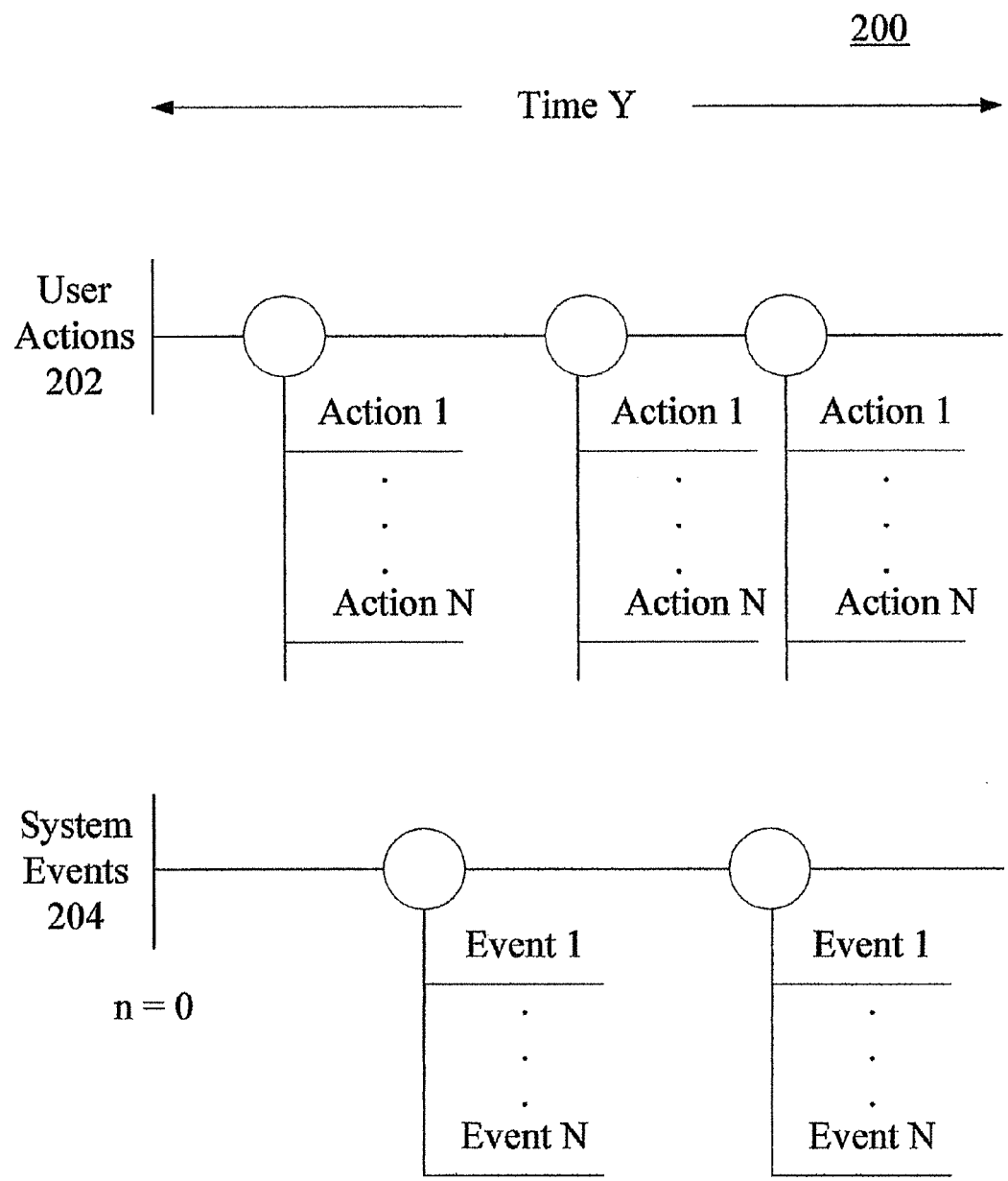
FIG. 2 is a schematic view of certain operative aspects of the module shown in FIG. 1.

Referring additionally now to FIG. 2, certain operative procedures 200 performed with the events-and-actions tracking module 102 are schematically shown. During the operation of the computer system 100, the events-and-actions tracking module 102 can detect and record one or more user actions 202 occurring at discrete points during a predetermined time period, Y. User actions can include, for example, keystrokes entered with a keyboard and/or actions entered using an electronic computer-connected mouse.

Likewise, the events-and-actions tracking module 102 can detect and record one or more system events 204, also occurring at discrete points during the time period, Y. A system event can include, for example, a processing event executed by the processor 104 according to computer-readable code contained in an application and/or operating system executing on the processor.

The recordation of user actions 202 and system events 204 by the module 102 can be stored in the memory 106. The memory 106 can comprise, for example, a hard drive or similar type of electronic memory unit having a finite storage capacity. (An aspect related to enhancing system performance subject to a finite-memory constraint is described more particularly below.)

Figure 3:
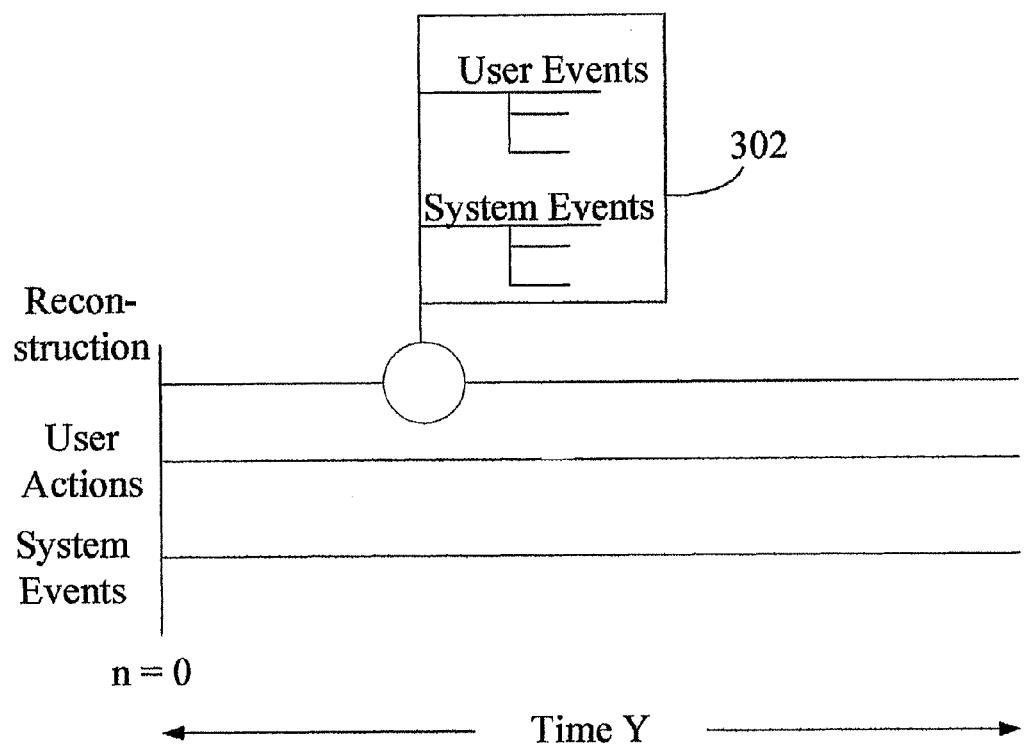
FIG. 3 is a schematic view of certain operative aspects of the module shown in FIG. 1.

Operatively, the module 102 is configured to synchronize the recordation of the user actions 202 and the recordation of the system events 204. So synchronized, the recordation of user actions 202 and system events 204 can be used by the module 102 to generate a presentation, such as a visual representation, indicating events and actions that occurred within the particular time period, Y. An exemplary view 300 of recorded events and actions is provided by the schematic illustration in FIG. 3.

In the event of a system failure or processing anomaly, such as a hang or crash, the module 102 is able to reconstruct and present the sequence of system events and user actions that occurred prior to the failure or processing anomaly. When presented by the module 102 in a video format upon a display screen of the I/O device 112, a user is able to view a succinct representation of the sequence of system events and user actions. According to one embodiment, the user can scroll through the illustrated sequence to select a particular breakpoint. A view 302 of the sequence of system events and user actions prior to and up until the selected breakpoint thus can be displayed to the user indicating the breakpoint along a time line corresponding to the time period Y. Accordingly, one aspect of this embodiment is that it provides a useful tool in diagnosing system failures and performance anomalies.

Optionally, the module 102 can be further configured to cause the system 100 to reconstruct a machine state of the system based upon the recordation of the at least one system event and the recordation of the at least one user action. The module 102, additionally, can be configured to cause the system to be reconfigured based upon the reconstruction of the machine state. Thus, when a system failure or processing anomaly necessitates the computer system 100 being re-booted, the user can access the visual representation of user actions and/or system events and select the point from which the user wishes the computer system to re-start. Thus, another aspect of this embodiment is an automated and non-intrusive protective tool for a user to utilize so as not to have to re-start every previous program or open every previous document when the computer system is re-started. The module 102 can bring the computer system 100 back to the state in which it was at the user-specified breakpoint along the time line.

According to a particular embodiment, the module 102 also can be configured to address the constraint imposed by the memory's 106 having only a finite amount of space. The module can be configured to employ a user-created profile. The profile can set the amount of space allocated. The profile can set a priority among different programs that are to be monitored. Various related user-specific preferences or parameters can be specified in the profile. Thus, for example, if the memory 106 space is becoming constrained, the module 102 can, based upon the user-specified profile, prioritize certain system events and/or user actions to record. The priority can be based, moreover, on the prioritization of corresponding application programs being executed by the computing system 100. The format in which recordation is stored in memory also can be specified in the profile. The format of previously-saved and dynamically-generated data can be altered so as to efficiently use a particular allocation of the memory 106.

Figure 4:
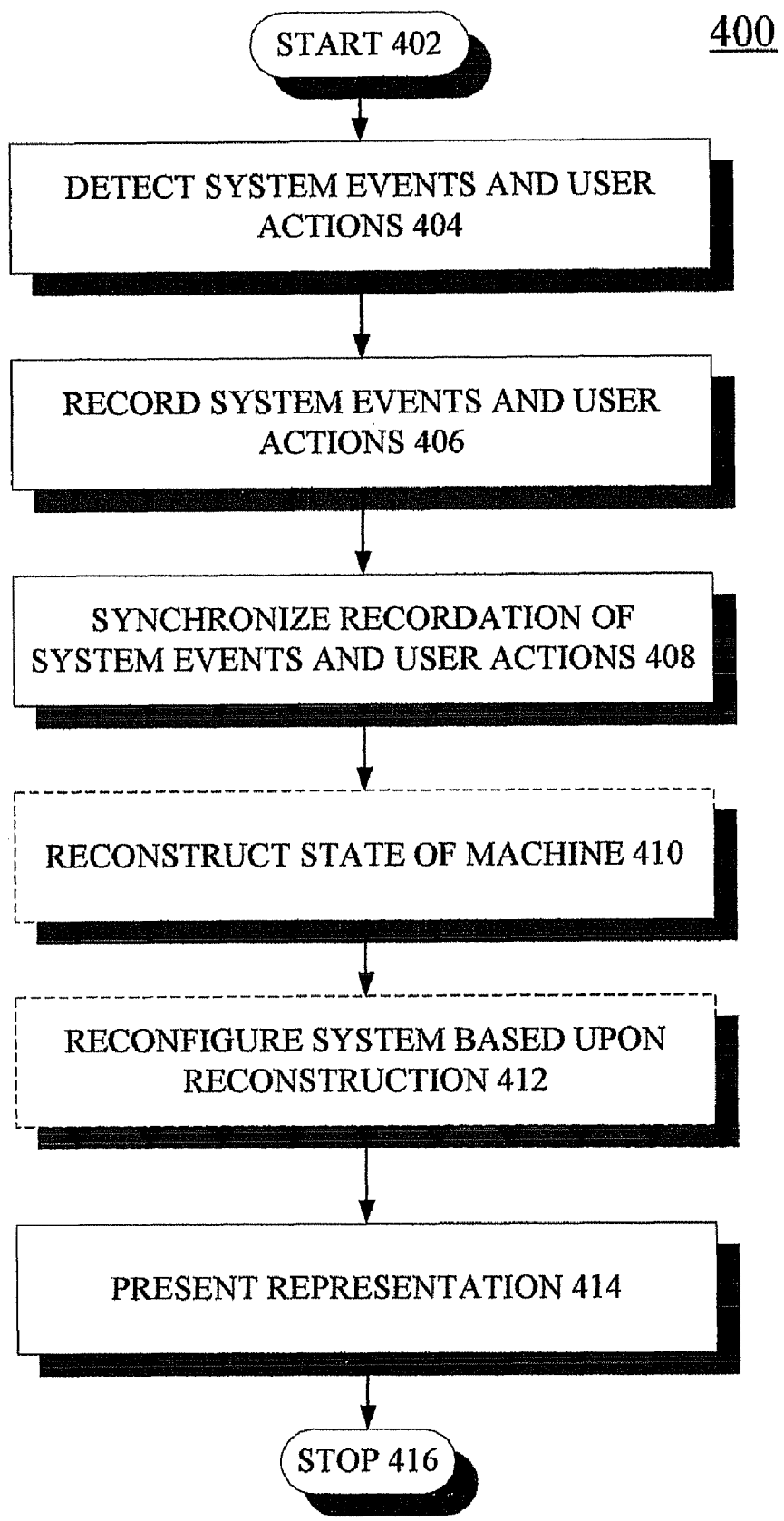
FIG. 4 is a flowchart of exemplary steps in a method for tracking computer system events and user events, according another embodiment of the invention.

Referring now to FIG. 4, certain method aspects are illustrated by a flowchart of exemplary steps. The method 400, after start at step 402, detects at least one system event of a computing system and at least one user action performed on the computing system at step 404. The method 400 continues at step 406 by recording the at least one system event and at least one user action. Further, according to the method 400, the recordation of the at least one system event and the recordation of the at least one user action are synchronized at step 408. At step 414, the method 400 includes presenting to a user the recordation of the at least one system event and the recordation of the at least one user action, wherein the recordation of each is synchronized with the other.

Optionally, the method 400 can include at step 410 reconstructing a machine state of the computing system based upon the recordation of the at least one system event and the recordation of the at least one user action. Optionally, the method 400 also can include reconfiguring the computing system based upon the reconstruction of the machine state.

According to one embodiment, presenting the recordation of the at least one system event and the recordation of the at least one user action at step 414 comprises presenting a visual representation of the at least one system event and the at least one user action upon visual display. According to another embodiment, detecting and recording at least one user action at steps 404 and 406, respectively, comprise detecting and recording at least one among a keystroke entered from a keyboard and a mouse action performed with an electronic computer-connected mouse. According to still another embodiment, detecting and recording at least one system event and at least one user action comprise detecting and recording a plurality of system events and user actions associated with a plurality of different computer applications. The method 400 can further comprise prioritizing the computer applications based upon a user-specified profile.

The method 400, if the at least one system event and the at least one user action comprise a plurality of system events and a plurality of user actions, can further comprise each of the following: selecting among the system events and action events based upon a user-specified profile; and recording those system events and action events selected in response to detecting the system events and action events.

The invention, as already noted, can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention, as also already noted, can be implemented as a computer program comprising computer-readable code embedded in a computer program product, such as a computer-readable optical disk. When loaded on and executed by a computer, the computer-readable code can cause the computer to perform the methods described herein. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The foregoing description of preferred embodiments of the invention have been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

We claim:

1. A computer-implemented method for tracking computer system events and user actions, the method comprising:
   detecting at least one system event of a computing system and at least one user action performed on the computing system;
   recording the at least one system event and at least one user action;
   synchronizing the recordation of the at least one system event and the recordation of the at least one user action;
   visually presenting to a user the recordation of the at least one system event and the recordation of the at least one user action along a time line corresponding to a time period;
   selecting by the user a point along the time line; and
   restarting the computer system from the selected point with corresponding recorded at least one system event and at least one user action upon an event that requires a restart of the computer system.

2. The method of claim 1, further comprising reconstructing a machine state of the computing system based upon the recordation of the at least one system event and the recordation of the at least one user action.

3. The method of claim 2, further comprising reconfiguring the computing system based upon the reconstruction of the machine state.

4. The method of claim 1, wherein the visual representation of the at least one system event and the at least one user action is presented upon a visual display.

5. The method of claim 1, wherein detecting and recording at least one user action comprise detecting and recording at least one among a keystroke entered from a keyboard and a mouse action performed with an electronic computer-connected mouse.

6. The method of claim 1, wherein detecting and recording at least one system event and at least one user action comprise detecting and recording a plurality system events and user actions associated with a plurality of different computer applications, and further comprising prioritizing the computer applications based upon a user-specified profile.

7. The method of claim 1, wherein the at least one system event and the at least one user action comprise a plurality of system events and a plurality of user actions, and further comprising:
   selecting among the system events and action events based upon a user-specified profile; and
   recording those system events and action events selected based upon the user-specified profile in response to detecting the system events and action events.

8. A computer-based system comprising:
   at least one processor for processing electronic data based upon processor-executable instructions;
   a memory communicatively linked to the at least one processor for storing electronic data; and
   an events-and-actions tracking module configured to execute upon the at least one processor for causing the system to
   detect at least one system event of a computing system and at least one user action performed on the computing system;
   record the at least one system event and at least one user action;
   synchronize the recordation of the at least one system event and the recordation of the at least one user action;
   visually present to a user the recordation of the at least one system event and the recordation of the at least one user action along a time line corresponding to a time period;
   select by the user a point along the time line; and
   restart the computer system from the selected point with corresponding recorded at least one system event and at least one user action upon an event that requires a restart of the computer system.

9. The system of claim 8, where the module is further configured to cause the system to reconstruct a machine state of the system based upon the recordation of the at least one system event and the recordation of the at least one user action.

10. The system of claim 9, where the module is further configured to cause the system to be reconfigured based upon the reconstruction of the machine state.

11. The system of claim 8, wherein the visual representation is presented upon a visual display.

12. The system of claim 8, wherein the module is configured to cause the system to detect and record at least one user action by detecting and recording at least one among a keystroke entered from a keyboard and a mouse action performed with an electronic computer-connected mouse.

13. The system of claim 8, wherein the module is configured to cause the system to detect and record a plurality system events and user actions associated with a plurality of different computer applications and to prioritize the computer applications based upon a user-specified profile.

14. The system of claim 8, wherein the at least one system event and the at least one user action comprise a plurality of system events and a plurality of user actions, and wherein the module is configured to cause the system to:
   select among the system events and action events based upon a user-specified profile; and
   record those system events and action events selected in response to detecting the system events and action events.

15. A computer-readable storage medium comprising computer-readable code that when loaded onto and executed by a computer cause the computer to:
   detect at least one system event of a computing system and at least one user action performed on the computing system;
   record the at least one system event and at least one user action;
   synchronize the recordation of the at least one system event and the recordation of the at least one user action;
   visually present to a user the recordation of the at least one system event and the recordation of the at least one user action along a time line corresponding to a time period;
   selecting by the user a point along the time line; and
   restarting the computer system from the selected point with corresponding recorded at least one system event and at least one user action upon an event that requires a restart of the computer system.

16. The computer-readable medium of claim 15, further comprising computer-readable code for causing the computer to reconstruct a machine state of the computing system based upon the recordation of the at least one system event and the recordation of the at least one user action.

17. The computer-readable medium of claim 16, further comprising computer-readable code for causing the computer to reconfigure the computing system based upon the reconstruction of the machine state.

18. The computer-readable medium of claim 15, wherein the visual representation of the at least one system event and the at least one user action is present upon a visual display.

19. The computer-readable medium of claim 15, wherein detecting and recording at least one user action comprise detecting and recording at least one among a keystroke entered from a keyboard and a mouse action performed with an electronic computer-connected mouse.

20. The computer-readable medium of claim 15, wherein detecting and recording at least one system event and at least one user action comprise detecting and recording a plurality system events and user actions associated with a plurality of different computer applications, and further comprising prioritizing the computer applications based upon a user-specified profile.

21. The computer-readable medium of claim 15, wherein the at least one system event and the at least one user action comprise a plurality of system events and a plurality of user actions, and further comprising computer-readable code for causing the computer to:
   select among the system events and action events based upon a user-specified profile; and
   record those system events and action events selected based upon the user-specified profile in response to detecting the system events and action events.

* * * * *